(12) United States Patent
Ko

(10) Patent No.: US 9,605,954 B2
(45) Date of Patent: Mar. 28, 2017

(54) DISTANCE MEASURING LASER POINTER

(71) Applicant: Flex Instrument Co., Ltd., New Taipei (TW)

(72) Inventor: Hsin-Chen Ko, New Taipei (TW)

(73) Assignee: Flex Instrument Co., Ltd., New Taipei (TW)

( * ) Notice: Subject to any disclaimer, the term of this patent is extended or adjusted under 35 U.S.C. 154(b) by 304 days.

(21) Appl. No.: 13/837,906

(22) Filed: Mar. 15, 2013

(65) Prior Publication Data

US 2014/0268097 A1 Sep. 18, 2014

(51) Int. Cl.
*G01C 3/08* (2006.01)

(52) U.S. Cl.
CPC ...................... *G01C 3/08* (2013.01)

(58) Field of Classification Search
CPC .......... G01C 15/004; G01C 3/00; G01C 3/08; F41G 1/35; F41G 1/473
USPC ........................................................ 356/4.03
See application file for complete search history.

(56) References Cited

U.S. PATENT DOCUMENTS

| 3,010,019 | A | * | 11/1961 | Sohst | 356/247 |
| 4,991,966 | A | * | 2/1991 | Raymond | 356/614 |
| 5,407,800 | A | * | 4/1995 | Gelfand et al. | 435/6.11 |
| 6,157,591 | A | | 12/2000 | Krantz | |
| 7,123,351 | B1 | * | 10/2006 | Schaefer | 356/4.07 |
| 7,375,621 | B1 | * | 5/2008 | Hines | 340/435 |
| 7,550,725 | B2 | * | 6/2009 | Hollander et al. | 250/338.1 |
| 8,249,461 | B2 | * | 8/2012 | Vaerndal | 398/118 |
| 8,256,153 | B1 | * | 9/2012 | Noha et al. | 42/117 |
| 8,705,013 | B2 | | 4/2014 | Inoue | |
| 8,793,920 | B2 | * | 8/2014 | Singh | 42/115 |
| 2002/0180949 | A1 | * | 12/2002 | Leutz et al. | 356/3.1 |
| 2010/0020333 | A1 | * | 1/2010 | Kunz et al. | 356/603 |

FOREIGN PATENT DOCUMENTS

TW       I263110 B    10/2006

* cited by examiner

*Primary Examiner* — Luke Ratcliffe
*Assistant Examiner* — Vicente Rodriguez
(74) *Attorney, Agent, or Firm* — Alan D. Kamrath; Kamrath IP Lawfirm, P.A.

(57) ABSTRACT

A distance measuring laser pointer has at least one laser source capable of emitting a light ray; and two optical elements, disposed in front of the at least one laser source, receiving and transferring the light ray into a first conic light beam and a set of multiple second conic light beams. The first conic light beam projects a first light pattern on a surface of a target, and the set of multiple second conic light beams project a second light pattern on the surface of the target. An intersection between the first light pattern and the second light pattern changes position depending on variation of a distance between the distance measuring laser pointer and the target to indicate the distance. The distance measuring laser pointer simultaneously indicates a diameter or length of the target when indicating the distance.

9 Claims, 19 Drawing Sheets

DISTANCE MEASURING LASER POINTER

BACKGROUND OF THE INVENTION

1. Field of the Invention

The present invention relates to an indicator and, more particularly, to a distance measuring laser pointer and method thereof. The distance measuring laser pointer emits a laser to indicate a distance between the distance measuring laser pointer and a target to be measured by projecting light patterns on a surface of the target. The distance measuring laser pointer simultaneously indicates a diameter or length of the target when indicating the distance. The present invention can be used in certain meters such as infrared thermometers.

2. Description of Related Art

Measuring methods for a distance between two objects or points may be implemented by rulers, sound waves, radio waves, light, etc. Measurement by sound waves or radio waves cannot easily identify the test zone of a target. Measurement by light requires electrical circuits, optical lenses and a sufficiently short measuring time, and, hence, the cost is high.

With reference to FIG. 1, a conventional laser pointer 80 projects a light spot on a surface 81 of a target, so that a user is able to precisely and clearly recognize the target to be pointed and indicated.

However, the aforementioned conventional laser pointer has no functions showing a distance between the indicator and the target or a length of the target.

To overcome the shortcomings, the present invention provides a distance measuring laser pointer and method thereof to mitigate or obviate the aforementioned problems.

SUMMARY OF THE INVENTION

The main objective of the invention is to provide a distance measuring laser pointer and method thereof. The distance measuring laser pointer emits a laser to indicate a distance between the distance measuring laser pointer and a target to be measured by projecting light patterns on a surface of the target. The distance measuring laser pointer simultaneously indicates a diameter or length of the target when indicating the distance. The present invention can be used in certain meters such as infrared thermometers.

A distance measuring laser pointer in accordance with the present invention comprises: at least one laser source capable of emitting a light ray; and two optical elements disposed in front of the at least one laser source, receiving and transferring the light ray into a first conic light beam and a set of multiple second conic light beams. The first conic light beam projects a first light pattern on a surface of a target, the set of the second conic light beams project a second light pattern on the surface of the target, and an intersection between the first light pattern and the second light pattern changes position depending on a variation of a distance between the distance measuring laser pointer and the target to indicate the distance.

A method for measuring a distance between two objects comprises using the aforementioned distance measuring laser pointer to emit two conical light beams to a target. The first conical light beam projects a first light pattern being a first light circle on the target. The set of the second conical light beams project a second light pattern being second light circles on the target to serve as a scale. An intersection between the first light circle of the first light pattern and the second light circles of the second light pattern changes position depending on a variation of a distance between the distance measuring laser pointer and the target to indicate the distance.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
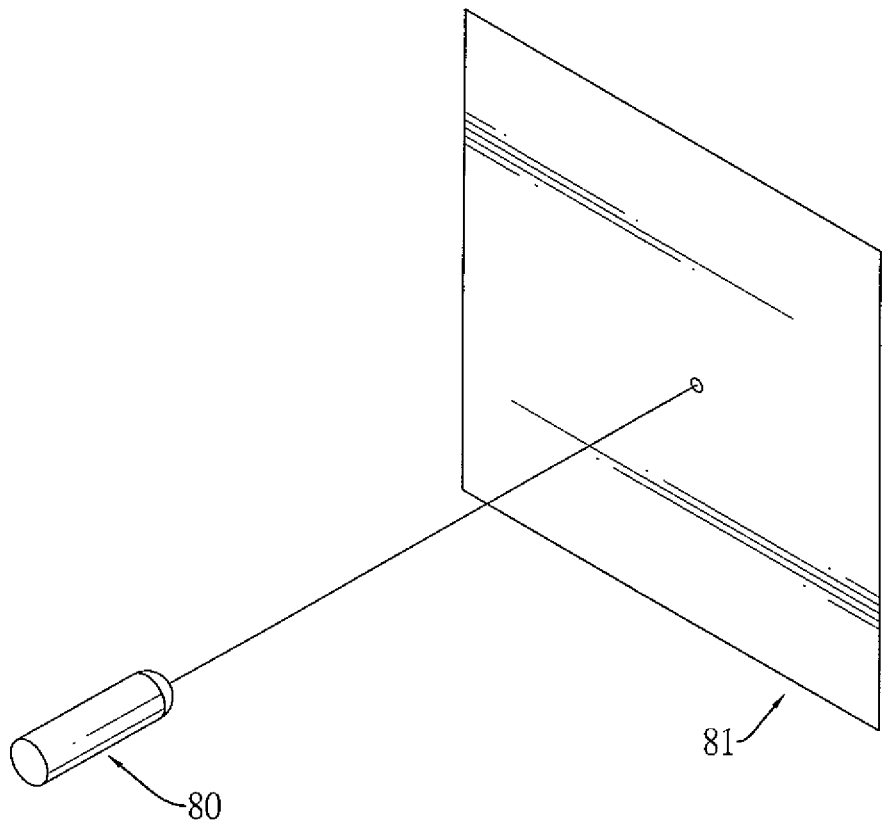
FIG. 1 is an operational view of a conventional laser pointer in accordance with the prior art projecting a light spot on a target surface.
Figure 2A:
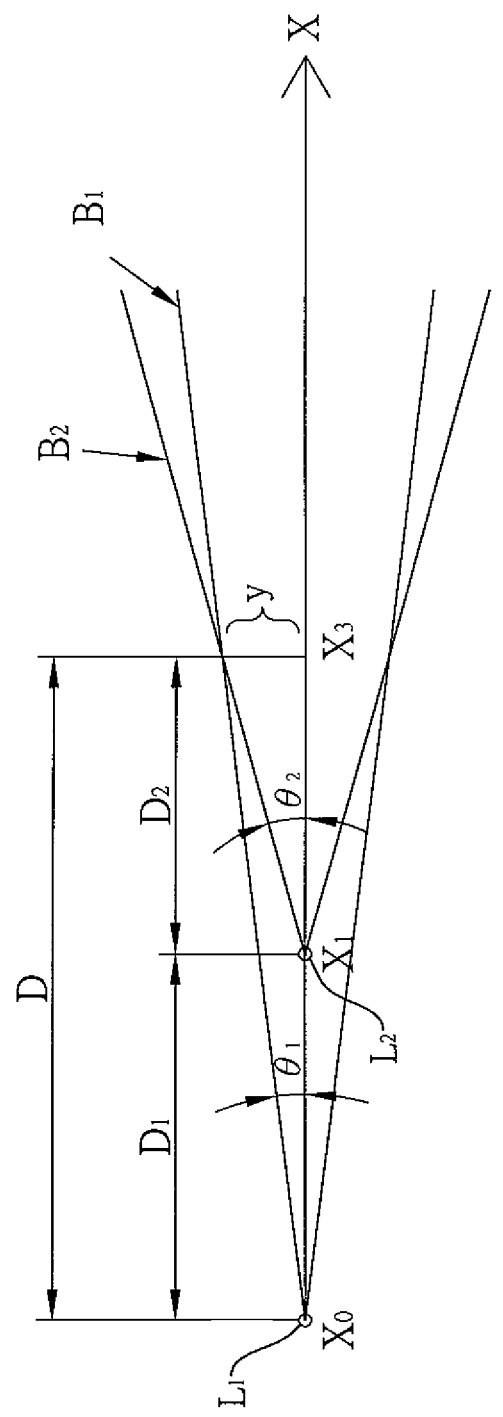
FIGS. 2A to 2E are schematic views of a distance measuring laser pointer in accordance with the present invention emitting a laser ray to a surface of a target.

With reference to FIG. 2A, a distance measuring laser pointer 40 in accordance with the present invention may have at least two low power laser sources to project two conic light beams. Tips of cones formed from the conic light beams are located in different positions. Changing tip angles of the cones modifies the projected light patterns from the conic light beams. Each low power laser source may cooperate with an optical element, so that the conic light beam projects a light pattern after passing through the optical element. The optical element may be a diffraction grating element, a holographic element, or an optical lens, such as a total internal/external reflection lens.

The distance measuring laser pointer 40 will be described in further detail.

In the distance measuring laser pointer 40, a first laser source $L_1$ is disposed in a position $X_0$. A light ray emitted from the first laser source $L_t$ passes through an optical element and forms a first conic light beam $B_1$. A second laser source $L_2$ is disposed in a position $X_1$. A light ray emitted from the second laser source $L_2$ passes through an optical element and forms at least one second conic light beam $B_2$. An included angle $\theta_1$ is defined between the first conic light beam $B_1$ and an X axis. An included angle $\theta_2$ is defined between the second conic light beam $B_2$ and the X axis. Furthermore, the distance measuring laser pointer is at a distance X from a surface of a target. Besides, a color of the light ray emitted from the first laser source $L_1$ may be the same as or different from that of the light emitted from the second laser source $L_2$.

Moreover, the first laser source $L_1$ may cooperate with two optical elements, so that a single light ray emitted from the first laser source $L_1$ passes through the optical elements to project a first light pattern $P_1$ and a second light pattern $P_2$ respectively by the optical elements. Optionally, the second laser source $L_2$ is not required and can be omitted.

The following equations will be used for explanation of the operation of the distance measuring laser pointer 40.

$$\tan \theta_1 = y/(D_1+D_2) \qquad (1)$$

$$\tan \theta_2 = y/D_2 \qquad (2)$$

$$(1)/(2), \tan \theta_2 = (1+D_1/D_2)\tan \theta_1 \qquad (3)$$

If a distance $D_1$ between the first laser source $L_1$ and second laser source $L_2$ is constant, varying the included angle $\theta_2$ will change a distance $D_2$ between an intersection of the first and second conic light beams $B_1$ and $B_2$ and the second laser source $L_2$.

In general, the first conic light beam $B_1$ and the at least one second conic light beam $B_2$ respectively project a first light pattern $P_1$ and a second light pattern $P_2$ on a surface of the target. An intersection between the first light pattern $P_1$ and the second light pattern $P_2$ changes position depending on variation of a distance between the distance measuring laser pointer and the target.

Furthermore, the first and second light patterns $P_1$, $P_2$ respectively present two concentric light circles that are a first light circle and a second light circle. When the distance measuring laser pointer 40 moves toward the surface of the target on which the light patterns are projected, for example, moving from the position $X_0$ to a position $X_3$, the concentric circles move toward each other. When the distance X is equal to the distance D, the light circles overlap completely.

With further reference to FIGS. 2B to 2E, the distance measuring laser pointer 40 may be assembled to a handheld device 10, and a relation between the first and second light patterns $P_1$, $P_2$ will be explained as follows.

Figure 2B:
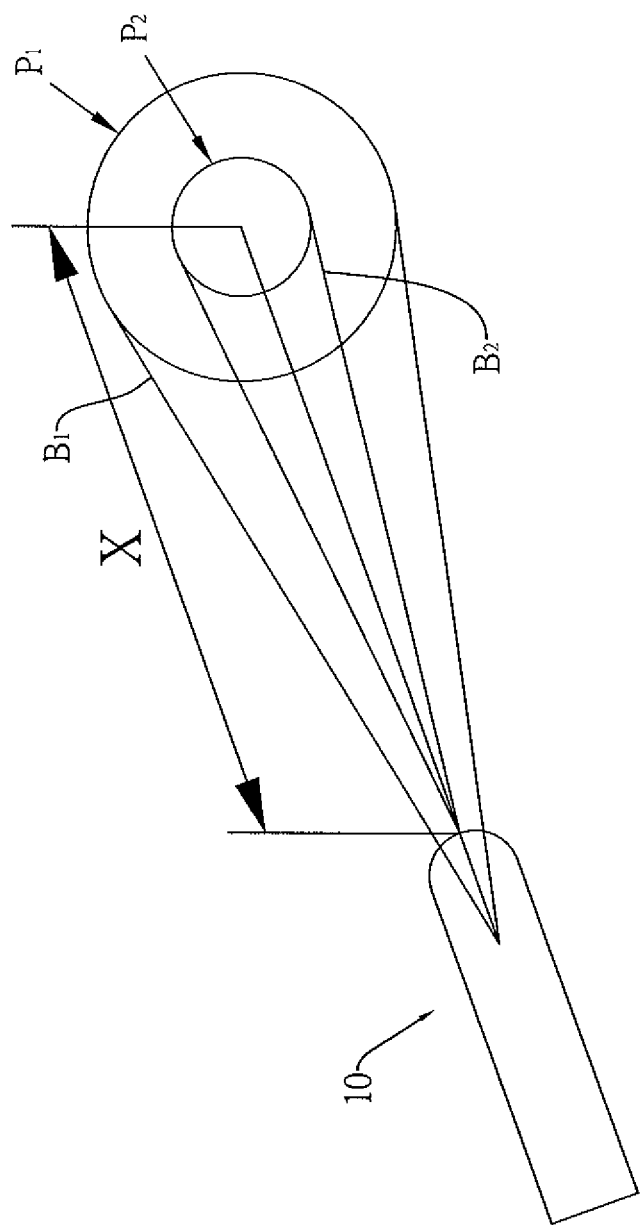

With reference to FIG. 2B, when distance X is smaller than distance D, the first light pattern $P_1$ and second light pattern $P_2$ project concentric first and second light circles. The first light circle corresponding to the included angle $\theta_1$ is the outer circle, and the second light circle corresponding to the included angle $\theta_2$ is the inner circle.

Figure 2C:
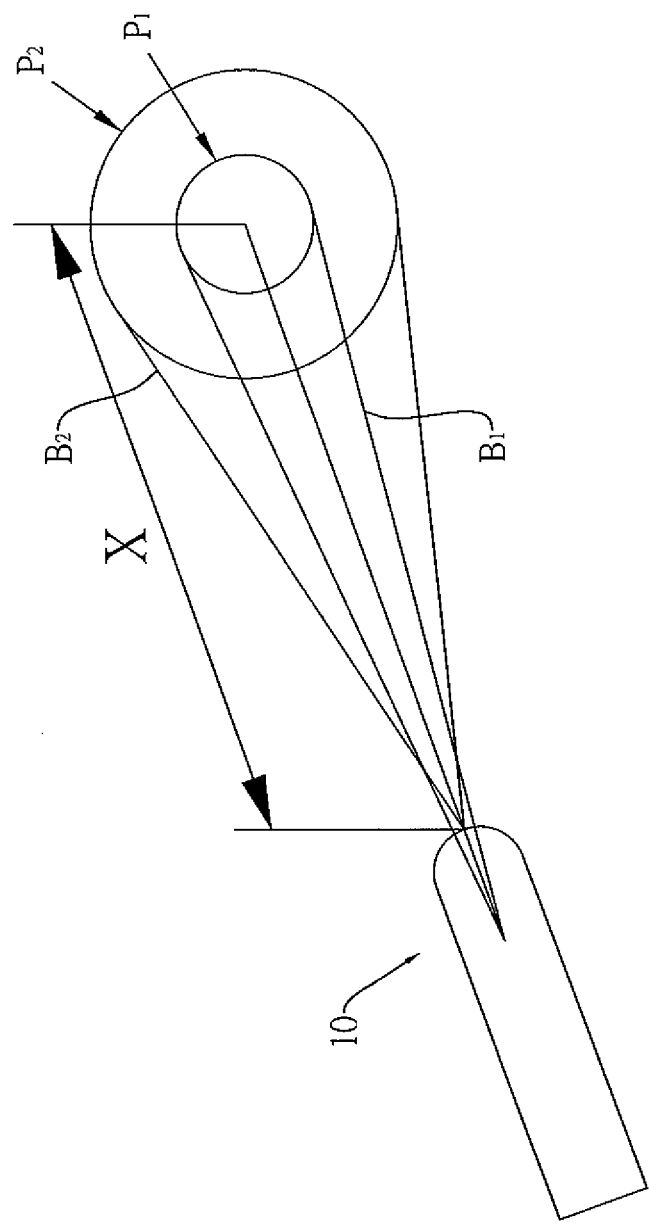

With reference to FIG. 2C, when distance X is larger than distance D, the first light pattern $P_1$ and second light pattern $P_2$ project concentric first and second light circles. The first light circle is the inner circle, and the second light circle is the outer circle.

Figure 2D:
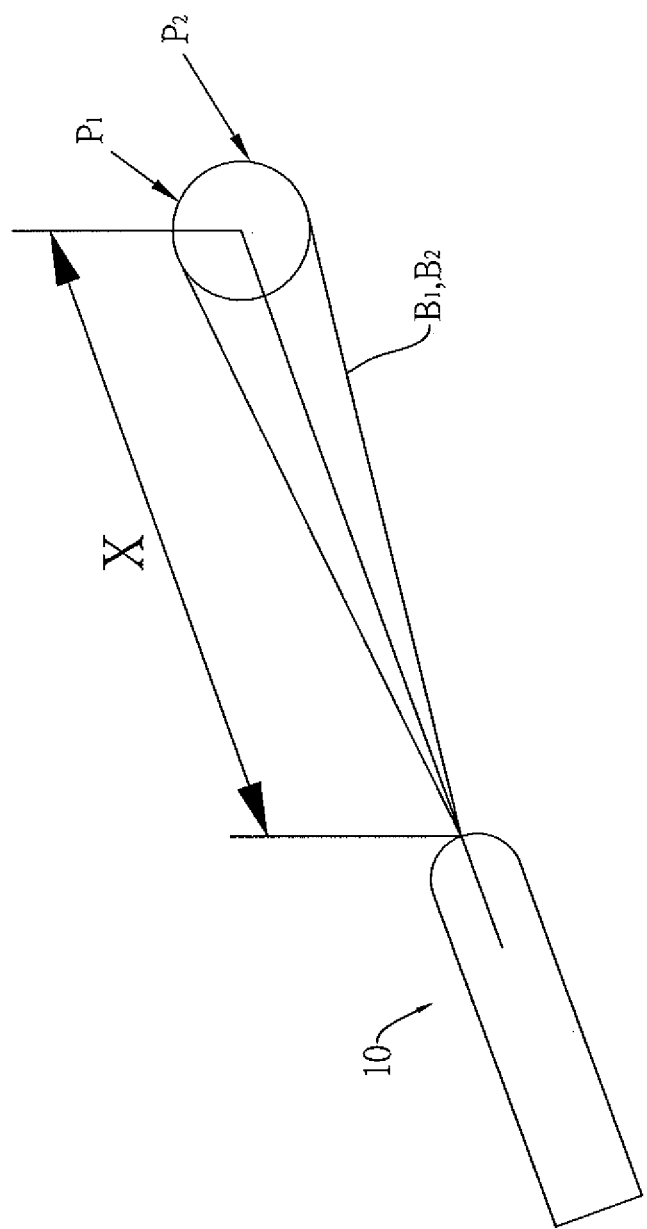

With reference to FIG. 2D, when distance X is equal to distance D, the first light pattern $P_1$ and the second light pattern $P_2$ project one light circle, because the first light circle overlaps completely with the second light circle.

Figure 2E:
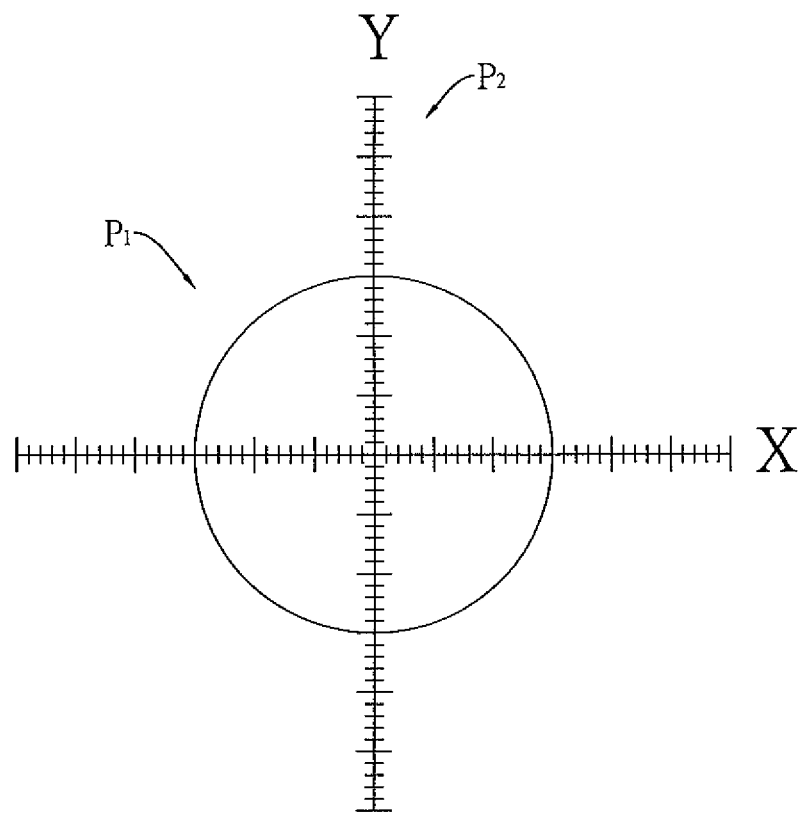

With reference to FIG. 2E, the light ray emitted from the second laser source $L_2$ in FIG. 2A passes through a diffraction grating element to emit a set of multiple second conic light beams $B_2$, so that the second light pattern $P_2$ projected by the set of the second conic light beams $B_2$ has multiple second light circles. Included angles $\theta_{2a}$, $\theta_{2b}$, $\theta_2 \ldots \theta_n$ are defined respectively between the second light circles and the X axis. By using mask-to-mask portions of each second light circle of the second light pattern $P_2$ and leaving sections respectively along an X axis and a Y axis, a light pattern of scale is formed. If the X axis is arranged to be a scale for distance D in FIG. 2A, the graduation on the X axis represents the distance between the distance measuring laser pointer and the target. Y axis may be arranged to be another scale different from that of X axis. For example, the graduation unit on X axis is a centimeter, and the graduation unit on Y axis is an inch. Therefore, the user may use the larger scale with a metric unit to estimate the rough size of the target and may further use the smaller scale with an imperial unit to recognize the precise size of the target.

Furthermore, the distance measuring laser pointer of the present invention is designed to have the following characteristics. When the first light pattern $P_1$ is overlapped with a graduation marking of the second light pattern $P_2$, the graduation marking is correct. Therefore, a user would not need to worry about the enlargement or reduction or the graduation marking at which the first and second light patterns $P_1$, $P_2$ are intersected due to the variation of projecting length between the distance measuring laser pointer and the target.

Figure 3A:
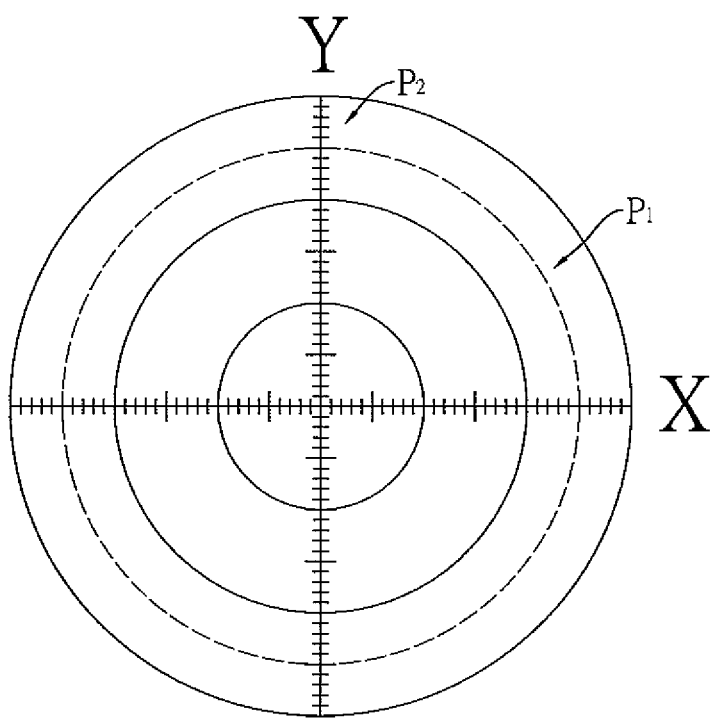
FIGS. 3A to 3E are schematic views of first and second light patterns projected by the distance measuring laser pointer in FIG. 2B.

With reference to FIG. 3A, a dotted light circle of the first light pattern $P_1$ and a scale with solid light circles of the second light pattern $P_2$ intersect at a graduation marking that shows the distance between the distance measuring laser pointer and the target. The X axis indicates a distance between the distance measuring laser pointer and the target. The Y axis indicates a diameter of the target.

Figure 3B:
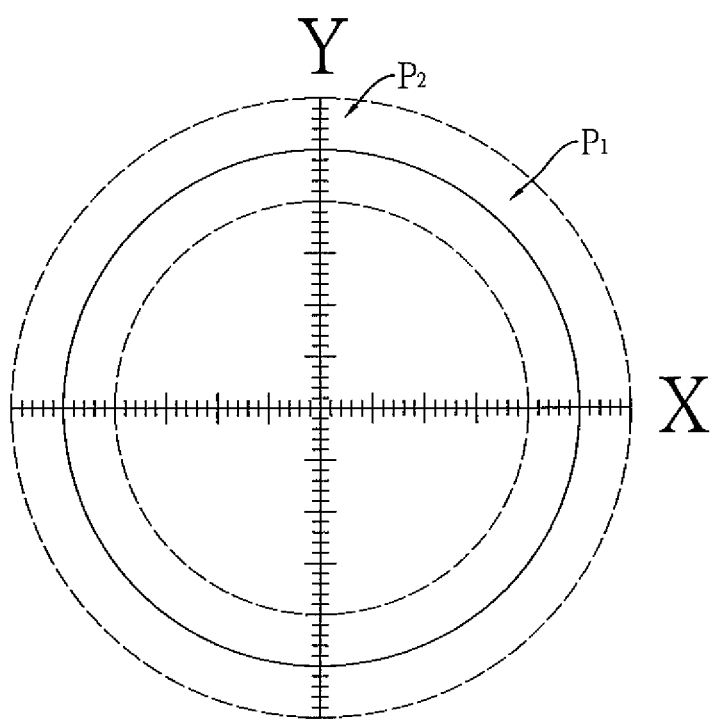

With reference to FIG. 3B, a solid light circle of the first light pattern $P_1$ and a scale with dotted light circles of the second light pattern $P_2$ intersect at a graduation marking that shows the distance between the distance measuring laser pointer and the target. The X axis indicates a distance between the distance measuring laser pointer and the target. The Y axis indicates a diameter of the target.

Figure 3C:
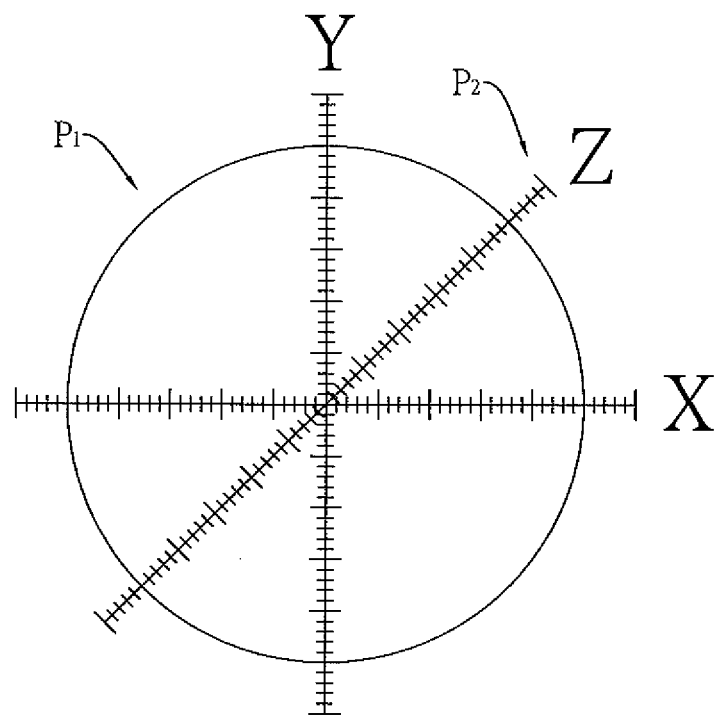

With reference to FIG. 3C, the second light pattern $P_2$ further has a Z axis indicating a smaller scale based on the X or Y axis.

Figure 3D:
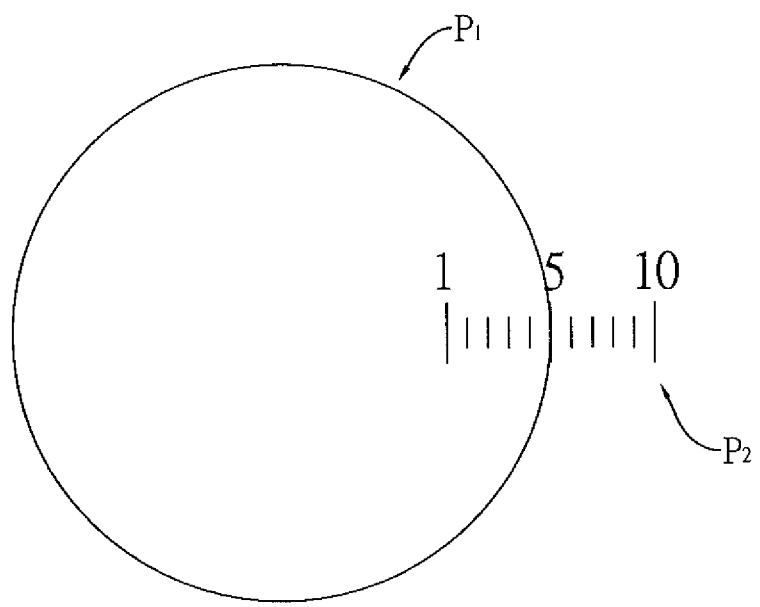
Figure 3E:
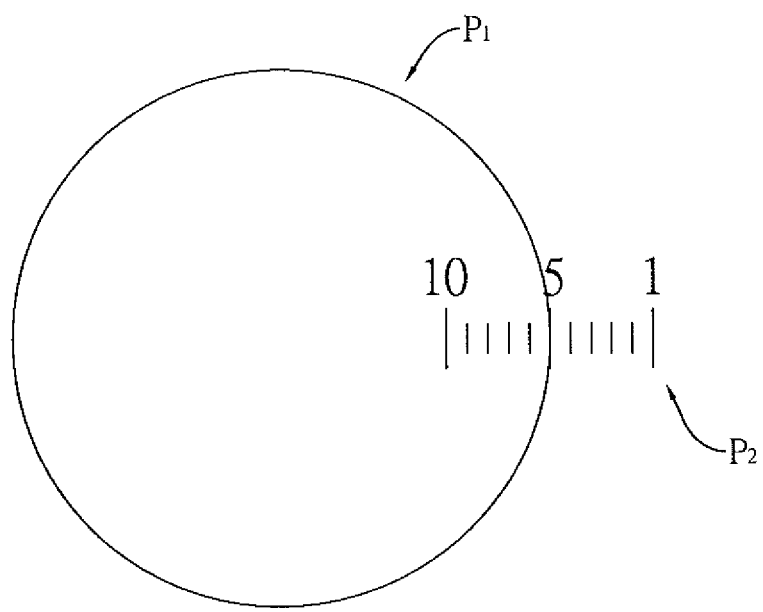

With reference to FIGS. 3D and 3E, the first conic light beam $B_1$ and the set of the second conic light beams $B_2$ are arranged non-coaxially in two parallel or non-parallel axes. The second light pattern $P_2$ projected from the set of the second conic light beams $B_2$ forms a scale for measuring distance. The scale has a graduation increasing progressively outward or inward.

Figure 3F:
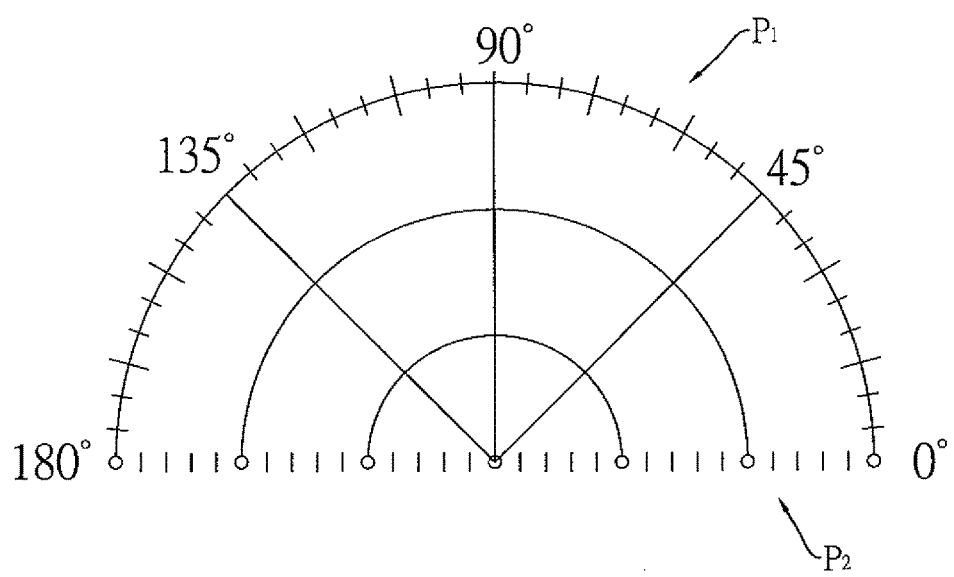
FIG. 3F is a schematic view of a calibration of a protractor ruler projected by the distance measuring laser pointer in FIG. 2B.

With reference to FIG. 3F, the first light pattern $P_1$ and second light pattern $P_2$ cooperatively form a protractor.

Figure 3G:
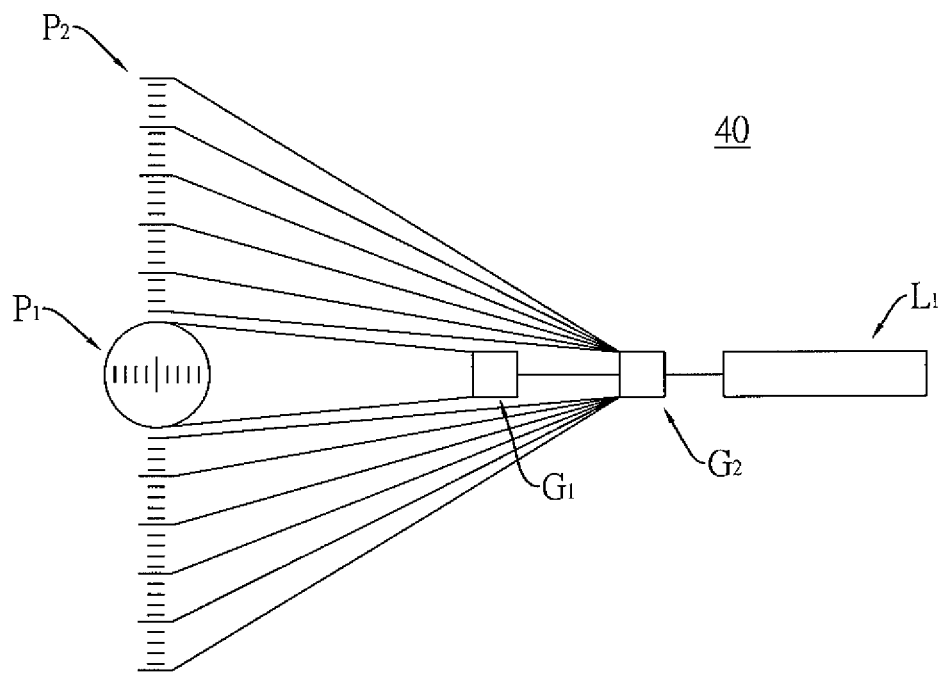
FIG. 3G is an operational schematic view of a laser module and two diffraction grating elements of the distance measuring laser pointer in FIG. 2B projecting the first and second light patterns.

With reference to FIG. 3G an embodiment of the distance measuring laser pointer 40 includes a first diffraction grating element $G_1$, a second diffraction grating element $G_2$, and a first laser source $L_1$.

Figure 3H:
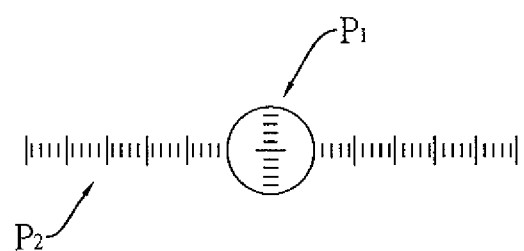
FIG. 3H is a schematic view of the first and second light patterns of FIG. 3G.

With further reference to FIG. 3H, the aforementioned first diffraction grating element $G_1$ and second diffraction grating element $G_2$ respectively project the first light pattern $P_1$ and second light pattern $P_2$.

Figure 3I:
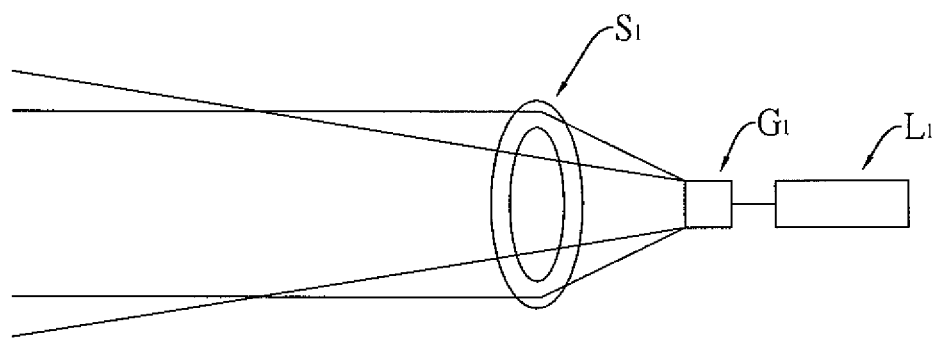
FIG. 3I is an operational schematic view of a laser module and an optical lens of the distance measuring laser pointer in FIG. 2B projecting the first and second light patterns.

With reference to FIG. 3I, in another embodiment of the distance measuring laser pointer, the two optical elements are a diffraction grating element $G_1$ and an optical lens $S_1$.

Figure 4A:
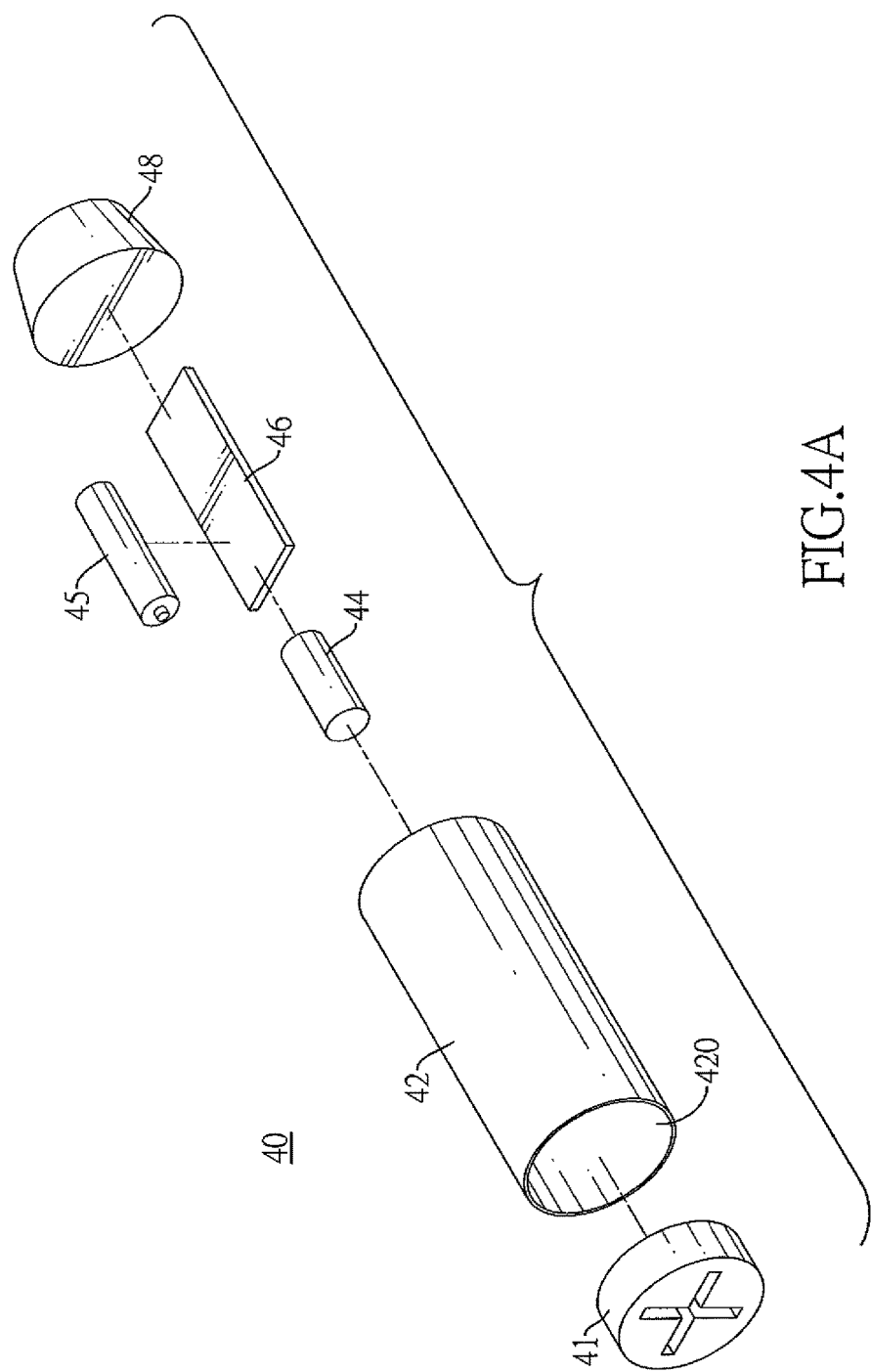
FIG. 4A is an exploded perspective view of an embodiment of the distance measuring laser pointer in FIG. 2B.

With reference to FIG. 4A, an exemplary and embodied distance measuring laser pointer of the present invention is shown for explanation of detailed structures. The distance measuring laser pointer is a handheld device and has an outer casing 42, a front cover 41, a rear cover 48, a laser module 44, a battery 45, and a printed circuit board (PCB) 46.

The outer casing 42 is hollow and has a cavity 420 defined therein. The front cover 41 and rear cover 48 are mounted respectively on opposite ends of the outer casing 42 by fasteners such as bolts or tenons and mortises. The laser module 44, battery 45, and PCB 46 are mounted in the cavity 420 of the outer casing 42 and connected together. The laser module 44 may be held by a resilient holding structure such as foam rubber.

With further reference to 4B depicting a side view of the laser pointer module 44, the laser module 44 has a first laser source $L_1$, and first and second diffraction grating elements $G_1$, $G_2$, and may further have a collimating lens. The first laser source $L_1$ may be a low power laser diode.

Figure 4B:
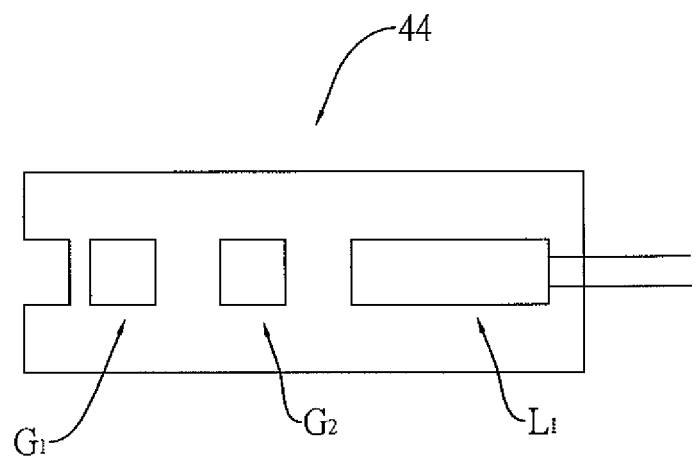
FIG. 4B is a schematic side view of the laser module of the distance measuring laser pointer in FIG. 4A.

The distance measuring laser indicator in FIGS. 4A and 4B is only an exemplary embodiment and not a limitation to the scope of the present invention. Various modifications may be made to the embodiment without departing from the spirit and scope of the present invention.

Figure 5A:
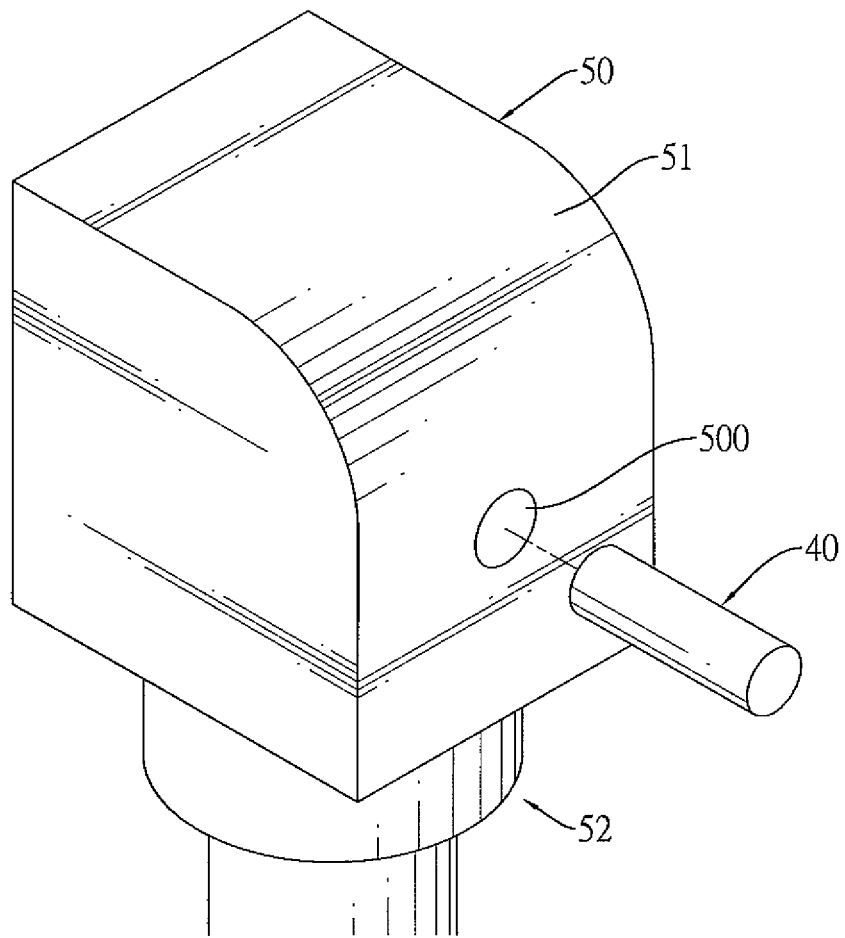
FIG. 5A is an exploded perspective view of the distance measuring laser pointer in FIG. 4A mounted in an infrared thermometer.
Figure 5B:
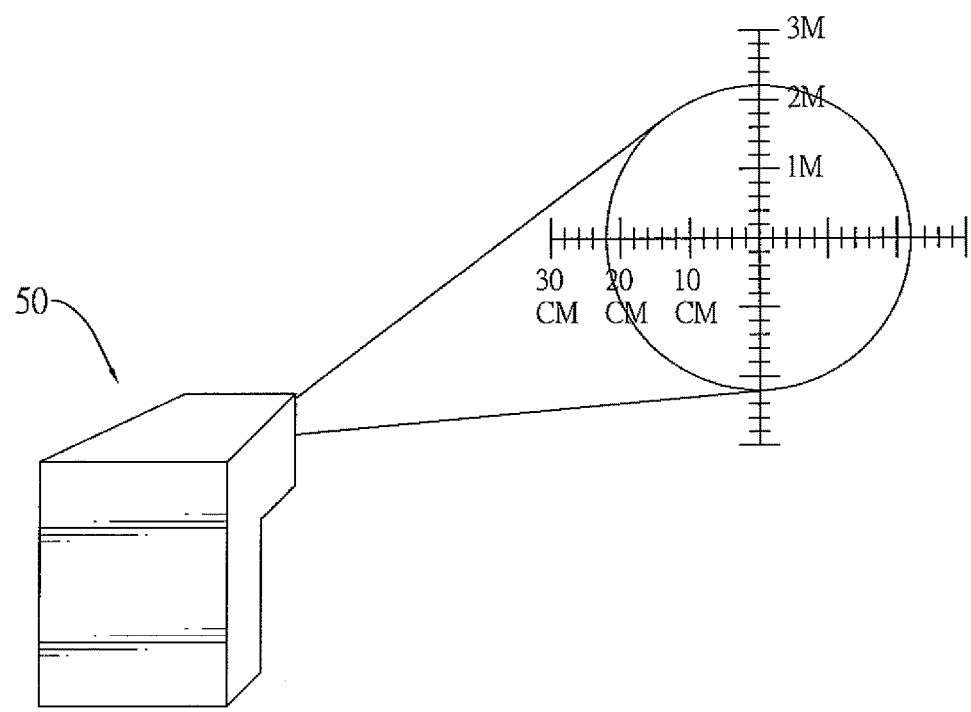
FIG. 5B is an exploded perspective view of the infrared thermometer in FIG. 5A with the distance measuring laser pointer projecting light patterns.

With reference FIGS. 5A and 5B, the distance measuring laser pointer is incorporated into an infrared thermometer 50.

With reference to FIG. 5A, the infrared thermometer 50 has a focusing reflection minor 51 and a thermopile sensor 52. The focusing reflection mirror 51 has a mounting hole 500 to receive the distance measuring laser pointer 40.

With reference to FIG. 5B, the infrared thermometer 50 incorporated with the distance measuring laser pointer 40 projects light patterns on a target to indicate the distance between the infrared thermometer 50 and the target and the size of the target.

Furthermore, under a condition that the first conic light beam $B_1$ and the set of the second conic light beams $B_2$ are coaxially arranged along an axis and located at different positions and the included angles $\theta_1$, $\theta_2$ thereof are different, when a projected plane is not perpendicular to the axis of the first and second conic light beams, the following method may be implemented to obtain a correct distance value: rotating the distance measuring distance laser pointer to make two intersections between a light circle of the first light pattern $P_1$ and the scale of the second light pattern $P_2$ symmetrical relative to a center of the scale, so that the graduation markings corresponding to the intersections are the correct values of the distance or diameter.

The aforementioned method is based on a principle: when a point A and a circle are on a same plane, a pair of points B, C must exist on the circle, with a distance from the point A to each point B, C of the pair being the same as that from the point A to the other point B, C of the pair.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A distance measuring laser pointer comprising:
at least one laser source emitting a light ray; and
two optical elements disposed in front of the at least one laser source, receiving and transferring the light ray into a first conic light beam and a set of multiple second conic light beams;
wherein the first conic light beam projects a first light pattern on a surface of a target, wherein the set of the second conic light beams project a second light pattern on the surface of the target, wherein an intersection between the first light pattern and the second light pattern changes position depending on variation of a distance between the distance measuring laser pointer and the target to indicate the distance;
wherein the at least one laser source includes a first laser source and a second laser source capable of emitting two light rays, and the two light rays respectively pass through and are transferred by the two optical elements into the first conic light beam and the set of the multiple second conic light beams.

2. The distance measuring laser pointer as claimed in claim 1, wherein each optical element is selected from a group of a diffraction grating element and an optical lens.

3. The distance measuring laser pointer as claimed in claim 1, wherein a color of the light ray emitted from the first laser source is the same as that of the light ray emitted from the second laser source.

4. The distance measuring laser pointer as claimed in claim 1, wherein a color of the light ray emitted from the first laser source is different from that of the light ray emitted from the second laser source.

5. The distance measuring laser pointer as claimed in claim 1, wherein the first light pattern is a solid light circle.

6. The distance measuring laser pointer as claimed in claim 1, wherein the first light pattern is a dotted light circle.

7. The distance measuring laser pointer as claimed in claim 1, wherein the second light pattern is multiple concentric light circles.

8. The distance measuring laser pointer as claimed in claim 1, wherein the second light pattern is a scale that has at least one axis.

9. The distance measuring laser pointer as claimed in claim 1, wherein the first and second laser sources are coaxial.

* * * * *